United States Patent
Li et al.

(10) Patent No.: US 12,476,279 B2
(45) Date of Patent: Nov. 18, 2025

(54) OLIGOMER SOLUTION OF POLYMER ELECTROLYTE, POLYMER ELECTROLYTE AND ELECTROCHEMICAL DEVICE

(71) Applicant: SHENZHEN BTR NEW ENERGY TECHNOLOGY RESEARCH INSTITUTE CO., LTD., Shenzhen (CN)

(72) Inventors: Junhuan Li, Shenzhen (CN); Yilin Han, Shenzhen (CN); Chenglin Yang, Shenzhen (CN); Zikun Li, Shenzhen (CN); Youyuan Huang, Shenzhen (CN)

(73) Assignee: SHENZHEN BTR NEW ENERGY TECHNOLOGY RESEARCH INSTITUTE CO., LTD., Shenzhen (CN)

( * ) Notice: Subject to any disclaimer, the term of this patent is extended or adjusted under 35 U.S.C. 154(b) by 0 days.

(21) Appl. No.: 18/703,724

(22) PCT Filed: Aug. 4, 2023

(86) PCT No.: PCT/CN2023/111161
§ 371 (c)(1),
(2) Date: Apr. 23, 2024

(87) PCT Pub. No.: WO2025/007384
PCT Pub. Date: Jan. 9, 2025

(65) Prior Publication Data
US 2025/0023097 A1    Jan. 16, 2025

(30) Foreign Application Priority Data
Jul. 4, 2023    (CN) .......................... 202310806247.1

(51) Int. Cl.
*H01M 10/0565* (2010.01)
*C08F 220/28* (2006.01)
(Continued)

(52) U.S. Cl.
CPC ..... *H01M 10/0565* (2013.01); *C08F 220/286* (2020.02); *C08F 220/30* (2013.01);
(Continued)

(58) Field of Classification Search
CPC ..... H01M 10/0565; H01M 2300/0082; H01M 2300/0085; C08F 220/30; C08F 220/301;
(Continued)

(56) References Cited

U.S. PATENT DOCUMENTS

| 5,237,031 A | 8/1993 | Kubota et al. |
| 2011/0117441 A1 | 5/2011 | Cheong et al. |

(Continued)

FOREIGN PATENT DOCUMENTS

| CN | 102142585 A | 8/2011 |
| CN | 109037771 A | 12/2018 |

(Continued)

OTHER PUBLICATIONS

GB/T 31467, Electrical performance test methods for lithium-ion traction battery pack and system of electric vehicles, China National Standards, State Administration for Market Regulation; Standardization Administration of PRC, 2023, pp. 1-40.
(Continued)

*Primary Examiner* — Joseph S Del Sole
*Assistant Examiner* — David L Miller
(74) *Attorney, Agent, or Firm* — Bayramoglu Law Offices LLC

(57) ABSTRACT

An oligomer solution of a polymer electrolyte, a polymer electrolyte, and an electrochemical device are provided. The oligomer solution of the polymer electrolyte comprises monomers and an electrolyte solution, the monomers form polymer molecular chains through free radical polymerization, and the polymer molecule chain is cross-linked to form a polymer electrolyte with a three-dimensional network
(Continued)

structure; the electrolyte solution comprises an organic solvent, which has strong mobility, permeates into pores of electrodes, promotes interface contact between the polymer electrolyte and the electrodes, improves the interface infiltration between the polymer electrolyte and the electrodes, increases the ion conductivity, facilitate lithium ion transmission, and enhances the electrochemical performance of a battery.

3 Claims, 2 Drawing Sheets

(51) Int. Cl.
*C08F 220/30* (2006.01)
*C08F 220/38* (2006.01)
*H01M 10/0525* (2010.01)
*C08F 20/16* (2006.01)
*C08F 20/18* (2006.01)
*C08F 20/30* (2006.01)
*C08F 212/12* (2006.01)

(52) U.S. Cl.
CPC ....... *C08F 220/38* (2013.01); *H01M 10/0525* (2013.01); *C08F 20/16* (2013.01); *C08F 20/18* (2013.01); *C08F 20/30* (2013.01); *C08F 212/12* (2013.01); *H01M 2300/0082* (2013.01); *H01M 2300/0085* (2013.01)

(58) Field of Classification Search
CPC .............. C08F 220/302; C08F 220/303; C08F 222/12; C08F 20/16; C08F 20/18; C08F 20/30

See application file for complete search history.

(56) References Cited

U.S. PATENT DOCUMENTS

| | | |
|---|---|---|
| 2011/0189550 A1 | 8/2011 | Zhao et al. |
| 2015/0197585 A1 | 7/2015 | Epps, III et al. |
| 2022/0045361 A1 | 2/2022 | Wild et al. |
| 2024/0097135 A1* | 3/2024 | Shibata ............... H01M 4/622 |

FOREIGN PATENT DOCUMENTS

| | | | | |
|---|---|---|---|---|
| CN | 112838267 A | | 5/2021 | |
| CN | 113228371 A | | 8/2021 | |
| CN | 109037770 B | | 9/2021 | |
| CN | 115172870 A | | 10/2022 | |
| CN | 115347233 A | | 11/2022 | |
| CN | 116014242 A | | 4/2023 | |
| CN | 116525935 A | * | 8/2023 | ........ C08F 220/1809 |
| JP | H11329064 A | | 11/1999 | |
| JP | 2002293833 A | | 10/2002 | |
| JP | 7197752 B1 | | 12/2022 | |
| KR | 20180091585 A | | 8/2018 | |
| WO | WO-2022138613 A1 | * | 6/2022 | ................ C08F 2/10 |

OTHER PUBLICATIONS

Longli Ma, et al., Gel Polymer Electrolyte with Anion-Trapping Boron Moieties via One-Step Synthesis for Symmetrical Supercapacitors, Macromol. Mater. Eng., 2020, pp. 1-10, vol. 305, 1900807.

* cited by examiner

OLIGOMER SOLUTION OF POLYMER ELECTROLYTE, POLYMER ELECTROLYTE AND ELECTROCHEMICAL DEVICE

CROSS REFERENCE TO THE RELATED APPLICATIONS

This application is the national phase entry of International Application No. PCT/CN2023/111161, filed on Aug. 4, 2023, which is based upon and claims priority to Chinese Patent Application No. 202310806247.1, filed on Jul. 4, 2023, the entire contents of which are incorporated herein by reference.

TECHNICAL FIELD

The present disclosure relates to the technical field of solid electrolytes, particularly to an oligomer solution of a polymer electrolyte, a polymer electrolyte and an electrochemical device.

BACKGROUND

Lithium ion batteries have the advantages of high energy density, long cycle life, small environment pollution, no memory effect and the like, and therefore are widely applied to electric automobiles and consumer electronics. The traditional lithium ion battery adopts an organic electrolyte solution as an electrolyte, but there are lithium dendrite growth and potential safety hazards such as flammability, explosiveness and volatile emissions during the use of the organic electrolyte solution. Therefore, the organic electrolyte solution can be replaced with a solid-state electrolyte, which can effectively improve the safety performance of the lithium ion battery.

The commercial anode material is generally graphite, or a silicon-based material whose surface is often coated with a carbon layer. A solid electrolyte interface film (SEI film) is easily generated on the interface of the anode, which greatly affects the electric performance and safety of the battery, whereas the formation and growth of the SEI film is significantly influenced by the infiltration of the electrolyte on graphite or the carbon coating layer, and good interface infiltration is a key factor to generate good interface contact. The commercial cathode material is generally a nickel cobalt manganese ternary metal compound with a high specific volume, the surface of the cathode has many metal ions and therefore possesses large polarity, a solid electrolyte film (SEI film) is easily formed on the interface of the cathode, similarly, the formation and action of the SEI film is significantly affected by interface contact and infiltration. Due to the lack of mobility in the solid electrolyte, there is poor interface infiltration between the electrolyte and the electrode, making it difficult for an electrolyte molecule to penetrate into the electrode. The effective interface contact area between the electrolyte and the electrode active substance decreases, resulting in the decreased ion conductivity of the electrolyte and thus the decreased transmission efficiency of lithium ions inside the battery.

SUMMARY

In view of this, the present application provides an oligomer solution of a polymer electrolyte, a polymer electrolyte and an electrochemical device. Through the present application, the interface infiltration between the polymer electrolyte and the electrode is improved, the ion conductivity is increased, the lithium ion transmission is promoted and the electrochemical performance of the battery is enhanced.

In a first aspect, the present application provides an oligomer solution of a polymer electrolyte, wherein the oligomer solution of the polymer electrolyte comprises monomers and an electrolyte solution, and the monomers comprise a first acrylate monomer containing a conjugated aromatic group and a second acrylate monomer containing a polar group.

In some embodiments, the conjugated aromatic group is selected from substituted or unsubstituted C5-C20 conjugated aromatic groups.

In some embodiments, the conjugated aromatic group is selected from at least one of substituted or unsubstituted phenyl, naphthyl, acenaphthenyl, fluorenyl, pyridyl, pyrrolyl, phenanthryl, anthryl, fluoranthryl, pyrenyl and biphenyl.

In some embodiments, the polar group comprises at least one of an oxygen atom, a sulfur atom, carbonyl and an ester group.

In some embodiments, the first acrylate monomer is selected from compounds represented by Formula I,

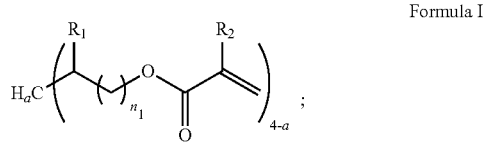

Formula I in Formula I, $R_1$ is selected from substituted or unsubstituted C5-C20 conjugated aromatic groups; $R_2$ is selected from a hydrogen atom or methyl; the value of n1 is a natural number ranging from 0 to 5; the value of a is a natural number ranging from 0 to 3;

the second acrylate monomer is selected from compounds represented by Formula II,

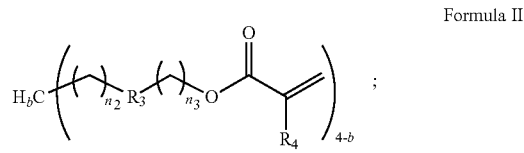

Formula II in Formula II, $R_3$ is the polar group, $R_4$ is selected from a hydrogen atom or methyl; the value of n2 is a natural number ranging from 1 to 5, and the value of b is a natural number ranging from 0 to 3.

In some embodiments, in the oligomer solution of the polymer electrolyte, the mass ratio of the first acrylate monomer to the second acrylate monomer is 1:9-9:1.

In some embodiments, the interface contact angle of the oligomer solution of the polymer electrolyte is C°, and the value of C is in a range of 30-60.

In some embodiments, the viscosity of the oligomer solution of the polymer electrolyte is D cP, and the value of D is in a range of 5-20.

In some embodiments, the mass percentage of the monomers in the oligomer solution of the polymer electrolyte is W %, and the value of W is in a range of 2-10.

In some embodiments, the mass percentage of the monomers in the oligomer solution of the polymer electrolyte is W %, the interface contact angle of the oligomer solution of the polymer electrolyte is C°, the viscosity of the oligomer solution of the polymer electrolyte is D cP, the impedance of the polymer electrolyte formed by polymerizing the oligomer solution of the polymer electrolyte is E mΩ, the ion conductivity of the polymer electrolyte formed by polymerizing the oligomer solution of the polymer electrolyte is F mS/cm, and the impedance meets the following relationship:

$$D*W*100/(F*\cos C) \leq E \leq D*W*400*\cos C.$$

In some embodiments, the mass percentage of the electrolyte solution in the oligomer solution of the polymer electrolyte is 88%-98%.

In some embodiments, the electrolyte solution comprises an organic solvent, an additive and a lithium salt.

In some embodiments, the electrolyte solution comprises an organic solvent, an additive and a lithium salt, and the mass percentage of the organic solvent in the electrolyte solution is 60%-80%.

In some embodiments, the electrolyte solution comprises an organic solvent, an additive and a lithium salt, and the organic solvent comprises carbonate compounds or carboxylate compounds.

In some embodiments, the organic solvent comprises carbonate compounds comprising at least one of ethyl carbonate, propylene carbonate, diethyl carbonate, dimethyl carbonate, methyl ethyl carbonate, ethylene carbonate, fluoroethylene carbonate, propylene carbonate and butene carbonate.

In some embodiments, the organic solvent comprises carboxylate compounds comprising at least one of ethyl acetate, ethyl propionate, propyl propionate, propyl acetate or benzyl formate.

In some embodiments, the electrolyte solution comprises an organic solvent, an additive and a lithium salt, and the mass percentage of the additive in the electrolyte solution is 1%-10%.

In some embodiments, the electrolyte solution comprises an organic solvent, an additive and a lithium salt, and the additive comprises at least one of vinyl sulfate, propane sultone, citric anhydride and triphenyl phosphite.

In some embodiments, the electrolyte solution comprises an organic solvent, an additive and a lithium salt, and the mass percentage of the lithium salt in the electrolyte solution is 10%-30%.

In some embodiments, the electrolyte solution comprises an organic solvent, an additive and a lithium salt, and the lithium salt comprises at least one of lithium hexafluorophosphate, lithium difluorosulfonymide, lithium trifluoromethylsulfonamide, lithium tetrafluoroborate, lithium bis(oxalate)borate and lithium difluorooxalate borate.

In some embodiments, the oligomer solution of the polymer electrolyte also comprises an initiator.

In some embodiments, the initiator comprises at least one of azonitrile compounds and peroxide compounds.

In some embodiments, the initiator comprises azonitrile compounds comprising azodiisobutyronitrile and/or azobisvaleronitrile.

In some embodiments, the initiator comprises peroxide compounds comprising at least one of benzoyl peroxide, tert-butyl benzoyl peroxide, dodecyl peroxide, diisopropyl dicarbonate peroxide, diisopropyl hydrogen peroxide, p-menthane hydrogen peroxide and methyl ethyl ketone peroxide.

In some embodiments, the mass percentage of the initiator in the oligomer solution of the polymer electrolyte is 0.02%-0.12%.

In some embodiments, the mass percentage of the electrolyte solution in the oligomer solution of the polymer electrolyte is 88%-98%.

In a second aspect, the present application provides a polymer electrolyte, the polymer electrolyte being obtained by in-situ polymerization and curing of the oligomer solution of the polymer electrolyte according to the first aspect, the polymer electrolyte comprising a polymer molecule chain with a structure represented by Formula III,

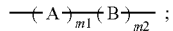

Formula III wherein, A is the first acrylate monomer represented by Formula I, B is the second acrylate monomer represented by Formula II, and m1>0, m2>0, and m1+m2>0; the first acrylate monomer and the second acrylate monomer are polymerized to form the polymer molecular chain, and the polymer molecular chain is cross-linked to form a polymer with a three-dimensional network structure;

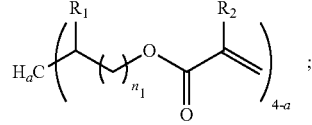

Formula I

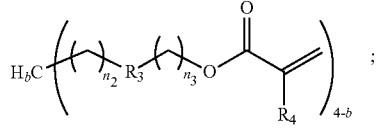

Formula II in Formula I, $R_1$ is selected from substituted or unsubstituted C5-C20 conjugated aromatic groups; $R_2$ is selected from a hydrogen atom or methyl; the value of n1 is a natural number ranging from 0 to 5; the value of a is a natural number ranging from 0 to 3;

in Formula II, $R_3$ is the polar group, $R_4$ is selected from a hydrogen atom or methyl; the value of n2 is a natural number ranging from 1 to 5, and the value of b is a natural number ranging from 0 to 3.

In some embodiments, the reaction temperature of the in-situ polymerization is 40° C.-80° C.

In some embodiments, the reaction time of in-situ polymerization is 6 h-24 h.

In some embodiments, the impedance of the polymer electrolyte is E mΩ, and the value of E is in a range of 30-100.

In some embodiments, the ion conductivity of the polymer electrolyte is F mS/cm, and the value of F is in a range of 1-9.

In a third aspect, the present application provides an electrochemical device, the electrochemical device comprising the polymer electrolyte according to the second aspect.

Compared with the prior art, the technical solution of the present application at least has the following beneficial effects:

the oligomer solution of the polymer electrolyte provided by the present application comprises monomers and the electrolyte solution, first of all, the first acrylate monomer contains a conjugated aromatic group with a multi-membered ring structure, which can generate π-π conjugation with graphite and the carbon layer (commonly available anode materials include graphite-based carbon materials or have carbon coating layers) containing large conjugated π multi-membered rings and can also form π-π conjugation with structural defect locations on the surface of the anode material, the large π bond of the conjugated ring has a delocalized π electron cloud, can undergo an electron conjugation effect with a carbon six-membered ring in the anode material, improves the interaction between the monomer and the surface of the anode material particle, promotes the infiltration and connection of the monomer on the surface of the anode material particle, facilitates the formation of the polymer molecular chain after monomer polymerization in the oligomer solution and improves the connection strength between the polymer molecular chain formed after monomer polymerization in the oligomer solution and the anode material, furthermore, a uniform and efficient interface layer is formed on the surface of the anode material particle, and the adhesion between the polymer electrolyte formed after curing of the oligomer solution and the electrode sheet can also be improved; second, the π-π conjugation generated by conjugated aromatic groups can promote the deposition of a polymer formed by polymerization of monomers in the oligomer solution at the interface followed by forming an interface coating after the polymer deposition, can improve an interface dielectric constant between the active substance and the electrolyte layer to generate a stronger dielectric shielding effect, an internal potential field is weakened under the action of the polymer coating, the directional movement of lithium ions at the tip of lithium dendrites is reduced so as to reduce the probability of piercing the polymer coating by lithium dendrites and improve the interface stability of the solid battery. Third, the π-π conjugation generated by conjugated aromatic groups can reduce the co-insertion reaction of the solvent in the electrolyte solution, namely, reduce the stripping of the carbon layer on the anode material (for example a graphite carbon layer), improve the structural stability of an anode active material during the charge and discharge, and help improving the charge and discharge cycle stability of the solid battery. Fourth, the second acrylic ester monomer contains a polar group which has a large molecular dipole moment and strong polarity; the polar group can react with structural defects (hydroxyl, amino, or carboxyl, etc.) in the carbon layer of the anode material to form chemical bonding, can also generate polar attraction with metal ions in a cathode material, can improve the connection strength between the polymer molecular chain formed by polymerization of monomers in the oligomer solution and anode and cathode materials, promote good interface contact formed between the cured solid electrolyte and the electrode plate, and contribute to improving the specific capacity of the electrochemical device.

The polymer electrolyte provided in the present application is formed by in-situ polymerization and curing of the oligomer solution of the polymer electrolyte mentioned above, the polymer molecular chains in the polymer electrolyte form a three-dimensional network structure through cross-linking points, this polymer electrolyte has adhesive property and can interact with the electrode to form a stable electrode and electrolyte interface, thereby improving the interface infiltration of the polymer electrolyte into the electrode; the electrolyte solution contains active lithium ions, has strong mobility and can penetrate into the pores of the electrode. Moreover, both the electrolyte solution molecule and the monomer molecule are polar molecules, and therefore can generate extremely strong interaction to form a stable and reliable polymer electrolyte gel, thereby improving the safety of the battery.

BRIEF DESCRIPTION OF THE DRAWINGS

Next, the present disclosure will be further described in combination with accompanying drawings and embodiments.

DETAILED DESCRIPTION OF THE EMBODIMENTS

Figure 1:
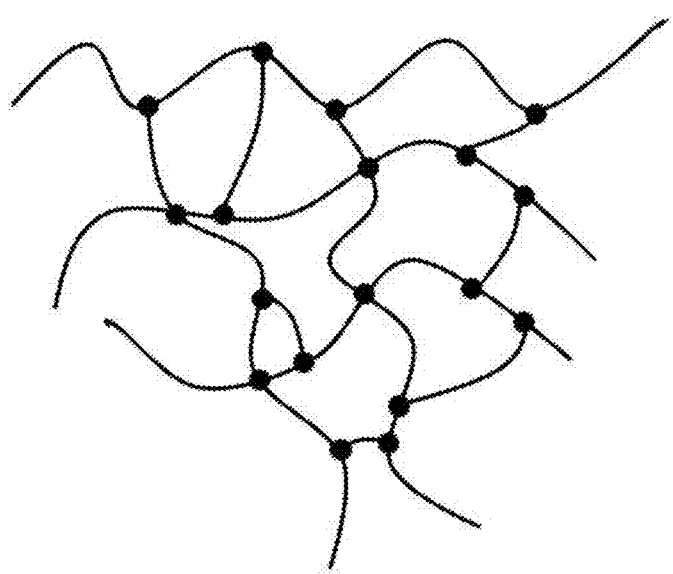
FIG. 1 is a diagram of a three-dimensional network structure of a polymer electrolyte provided in examples of the present application.

In order to better understand the technical solution of the present disclosure, the embodiments of the present disclosure will be described in detail in combination with accompanying drawings below.

It should be clarified that the described embodiments are only some embodiments of the present disclosure, but not all the embodiments. Based on the embodiments of the present disclosure, other embodiments obtained by a person of ordinary skill in the art without creative efforts fall within the protective scope of the present disclosure.

Terms used in the embodiments of the present disclosure are only for the purpose of describing specific embodiments, but are not intended to limit the present disclosure. The singular form "a", "the" and "this" used in the embodiments of the present disclosure and appended claims are intended to include plural forms, unless the context clearly indicates other meanings.

It should be understood that the terms "and/or" used herein is only a description of an association relationship between related objects, indicating that there can be three types of relationships, such as A and/or B, which can represent: the existence of A alone, the coexistence of A and B, and the existence of B alone. In addition, the character "/" herein generally indicates that an associated object is an "OR" relationship.

In a first aspect, the present application provides an oligomer solution of a polymer electrolyte, wherein the oligomer solution of the polymer electrolyte comprises monomers and an electrolyte solution, and the monomers comprise a first acrylate monomer containing a conjugated aromatic group and a second acrylate monomer containing a polar group.

The oligomer solution of the polymer electrolyte provided by the present application comprises monomers and an electrolyte solution, first of all, the first acrylate monomer contains a conjugated aromatic group which is in a multi-membered ring structure, can generate π-π conjugation with graphite and a carbon layer with a conjugated large π multi-membered ring and can also form π-π conjugation with structural defect locations on the surface of the anode material, the large π bond of the conjugated ring has a delocalized π electron cloud, can undergo an electron conjugation effect with a carbon six-membered ring in the anode material, improves the interaction between the monomer and the surface of the anode material particle (for example a silicon-based anode material and graphite anode material), promotes the infiltration and connection of the monomers on the surface of the anode material particle, facilitates the formation of the polymer molecular chain after monomer polymerization in the oligomer solution and improves the connection strength between the polymer molecular chain formed after monomer polymerization in the oligomer solution and the anode material, furthermore, a uniform and efficient interface layer is formed on the surface of the anode material particle, and the adhesion between the polymer electrolyte formed after curing of the oligomer solution and the electrode sheet can also be enlarged; second, the π-π conjugation generated by conjugated aromatic groups can promote the deposition of a polymer formed by polymerization of monomers in the oligomer solution at the interface followed by forming an interface coating after the polymer deposition, can improve an interface dielectric constant between the active substance and the electrolyte layer to generate a stronger dielectric shielding effect, an internal potential field is weakened under the action of the polymer coating, the directional movement of lithium ions at the tip of lithium dendrites is reduced so as to reduce the probability of piercing the polymer coating by lithium dendrites and improve the interface stability of the solid battery. Third, the π-π conjugation generated by conjugated aromatic groups can reduce the co-insertion reaction of a solvent in the electrolyte solution, namely, reduce the stripping of the carbon layer on the anode material (for example a graphite carbon layer), improve the structural stability of an anode active material during the charge and discharge, and help improving the charge and discharge cycle stability of the solid battery.

In addition, the second acrylic ester monomer contains a polar group which has a large molecular dipole moment and strong polarity; the polar group can react with structural defects (hydroxyl, amino, or carboxyl, etc.) in the carbon layer of the anode material to form chemical bonding, can also generate polar attraction with metal ions in a cathode material, can improve the connection strength between the polymer molecular chain formed by polymerization of monomers in the oligomer solution and the anode material or the cathode material, promote good interface contact formed between the cured solid electrolyte and the electrode plate, and contribute to improving the specific capacity of the electrochemical device. The electrolyte solution contains active lithium ions, has strong mobility, can permeate into pores of the electrode. Moreover, both the electrolyte solution molecule and the monomer molecule are polar molecules, and therefore can generate extremely strong interaction to form a stable and reliable polymer electrolyte gel, thereby improving the safety of the battery.

In some embodiments, the conjugated aromatic group is selected from substituted or unsubstituted C5-C20 conjugated aromatic groups, specifically, the conjugated aromatic group is selected from at least one of substituted or unsubstituted phenyl, naphthyl, acenaphthenyl, fluorenyl, pyridyl, pyrrolyl, phenanthryl, anthryl, fluoranthryl, pyrenyl and biphenyl. It can be understood that the first acrylate monomer in the monomers contains a conjugated aromatic group which is in multi-membered ring structure and can generate π-π conjugation with graphite and a carbon layer that is a conjugated large π multi-membered ring, the large π bond of the conjugated ring has a delocalized π electron cloud, generate an electron conjugation effect with a carbon six-membered ring in a graphite sheet layer, improve the interaction between the monomer and the surface of the anode particle, promote the infiltration and distribution of the monomer on the surface of the anode particle, is conducive to forming a polymer molecular chain after polymerization of the monomers in the oligomer solution, and forming a uniform and efficient interface layer on the surface of the electrode particle. The conjugation can also reduce the co-insertion reaction of the electrolyte solvent, reduce the stripping of the carbon layer on the surface of the electrode material particle by the organic solvent in the electrolyte, improve the structural stability of the electrode material during the charge and discharge, and is conducive to improving the charge-discharge cycle stability of the battery.

In some embodiments, the polar group comprises at least one of an oxygen atom, a sulfur atom, carbonyl or an ester group. It can be understood that the polar group has large molecule diple moment and strong polarity; the polar group can react with structure defects (hydroxyl, amino or carboxyl, etc.) of the carbon layer in the anode material to form chemical bonding, can also generate polar attraction with metal ions in the cathode material, can improve the connection strength between the polymer molecular chain formed by polymerization of monomers and the anode material or the cathode material, promote the formation of good interface contact between the cured solid electrolyte and the electrode plate, and is conducive to improving the specific capacity of the electrochemical device.

In some embodiments, the first acrylate monomer is selected from compounds represented by Formula I,

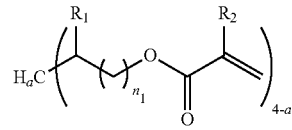

Formula I in Formula I, $R_1$ is selected from substituted or unsubstituted C5-C20 conjugated aromatic groups; $R_2$ is selected from a hydrogen atom or methyl; the value of n1 is a natural number ranging from 0 to 5; the value of a is a natural number ranging from 0 to 3;

the second acrylate monomer is selected from compounds represented by Formula II,

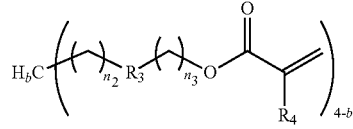

Formula II in Formula II, $R_3$ is the polar group, $R_4$ is selected from a hydrogen atom or methyl; the value of n2 is a natural number ranging from 1 to 5, and the value of b is a natural number ranging from 0 to 3.

Specifically, the value of n1 is 0, 1, 2, 3, 4 or 5. Preferably, the value of n1 is 1 or 2.

The value of n2 can be 1, 2, 3, 4 or 5. Preferably, the value of n2 is 1 or 2.

The value of n3 specifically can be 1, 2, 3, 4 or 5. Preferably, the value of n3 is 1 or 2.

The value of a specifically can be 0, 1, 2 or 3. Preferably, the value of a is 0 or 1.

The value of b specifically can be 0, 1, 2 or 3. Preferably, the value of b is 0 or 1.

In some embodiments, $R_3$ is an oxygen atom, and the second acrylate monomer contains an ether oxygen bond. After the monomers are polymerized to form a polymer molecule chain, the polymer molecule chain can maintain an irregular flexible structure, which benefits for free extension of the molecular chain. The polymer molecule chain is prone to generating a complexing action with the lithium salt and the solvent in the electrolyte, thereby improving the dissolution and absorption capacity of the polymer molecule chain on the lithium salt and the electrolyte solution and further promoting flexibility so that the movement ability of the polymer chain is stronger, the diffusion resistance on the interface of the electrode is smaller, and the infiltration effect of the solid electrolyte on the surface and interface of the electrode is improved. In some embodiments, in the oligomer solution of the polymer electrolyte, a mass ratio of the first acrylate monomer to the second acrylate monomer is 1:9-9:1. Specifically, a mass ratio of a first compound to a second compound can be 1:1, 1:2, 1:3, 1:4, 1:5, 1:6, 1:7, 1:8, 1:9, 9:1, 8:1, 7:1, 6:1, 5:1, 4:1, 3:1 or 2:1, etc., of course, it can also be other values within the above-mentioned range, without limitation here. It can be understood that in a proper proportion of the first acrylate monomer and the second acrylate monomer in the monomers, the polymer molecule chain can maintain the irregular flexible structure, which benefits for free extension of the molecular chain, further promotes flexibility so that the movement capacity of the polymer chain is stronger, the diffusion resistance on the interface of the electrode is smaller, and the infiltration effect of the solid electrolyte on the surface and interface of the electrode is improved. Preferably, the mass ratio of the first acrylate monomer to the second acrylate monomer is 1:4-4:1.

In some embodiments, the interface contact angle of the oligomer solution of the polymer electrolyte is C°, and the value of C is in a range of 30-60. Specifically, the interface contact angle can be 30°, 32°, 35°, 38°, 39°, 40°, 43°, 45°, 47°, 50°, 54°, 55°, 56°, 58° or 60°, etc., and it can also be other values ranging from 30° to 60°, without limitation here. It can be understood that the contact and infiltration between the polymer electrolyte and the electrode can be characterized by the interface contact angle of the oligomer solution of the polymer electrolyte. The electrolyte is spread on the surface of the electrode to generate a contact angle at a gas-liquid-solid interface. Generally speaking, the smaller contact angle shows a better interface infiltration effect.

In some embodiments, the viscosity of the oligomer solution of the polymer electrolyte is D cP, and the value of D is in a range of 5-20. Specifically, the value of D can be 5, 6, 7, 8, 9, 10, 11, 13, 15, 16, 17, 18, 19 or 20, etc., of course, it can also be other values within the above-mentioned range, without limitation here. It can be understood that the infiltration and mobility of the electrolyte material itself can be characterized by the viscosity of the oligomer solution of the polymer electrolyte. The electrolyte is infiltrated into the electrode, and the infiltration process is affected by many factors such as viscosity and mobility of the electrolyte material and interaction with the electrode. Generally speaking, the lower material viscosity is more beneficial for the flow wetting of the oligomer solution of the electrolyte on the electrode.

In some embodiments, the mass percentage of the monomers in the oligomer solution of the polymer electrolyte is W %, and the value of W is in a range of 2-10. Specifically, the value of W can be 2, 3, 4, 5, 6, 7, 8, 9 or 10, etc., of course, it can also be other values ranging from 2 to 10, without limitation here. It can be understood that the mass ratio of the monomers in the oligomer solution of the polymer electrolyte is controlled within the above-mentioned range, thereby exerting the interaction between the conjugated aromatic group and polar group of the monomer and metal ions and a carbon layer of the electrode, and improving the interface infiltration between the electrolyte and the electrode.

In some embodiments, the mass percentage of the monomers in the oligomer solution of the polymer electrolyte is W %, the interface contact angle of the oligomer solution of the polymer electrolyte is C°, the viscosity of the oligomer solution of the polymer electrolyte is D cP, the impedance of the polymer electrolyte formed by polymerizing the oligomer solution of the polymer electrolyte is E mΩ, the ion conductivity of the polymer electrolyte formed by polymerizing the oligomer solution of the polymer electrolyte is F mS/cm, and the impedance meets the following relationship:

$$D*W*100/(F*\cos C) \le E \le D*W*400*\cos C.$$

Through lots of tests, it is found that there is association relationship among the impedance E and ion conductivity F, the contact angle C and viscosity D of the oligomer solution of the polymer electrolyte, and the mass ratio W of the monomers in the oligomer solution of the polymer electrolyte, the excessive or insufficient mass ratio of the monomer can affect the contact angle and viscosity of the oligomer solution of the polymer electrolyte, and then the contact angle and viscosity can affect the impedance and ion conductivity of the electrolyte. By controlling the above-mentioned five parties within the above-mentioned range, the interface infiltration between the electrolyte and the electrode can be improved so that the interface contact between the electrolyte and the electrode exhibits the best infiltration effect. The content, i.e., mass percentage, of the monomers in the oligomer solution of the polymer electrolyte determines the percentages of the monomers in the oligomer solution and components in the electrolyte solution, significantly affects the viscosity D of the oligomer solution, synergistically controls the mass content W of the monomer and the structure of the polymer, and greatly influences the content angle C of the oligomer solution of the polymer electrolyte on the electrode plate; in addition, the mass content W of the monomer can also affect the mass percentage of the polymer molecule chain in the solid electrolyte, its unique chemical structure also determines the ion conductivity of the polymer electrolyte, and therefore the mass content W of the monomer and the chemical structure of the monomer jointly affect the ion conductivity F of the electrolyte, the impedance E of the electrolyte in the solid battery varies due to the combined effects of the properties of the electrolyte itself, namely ion conductivity F, and factors affecting the wetting contact of the electrolyte at the interface (the viscosity D and contact angle C of the oligomer solution). By controlling the synthesis of a chemical structure of a monomer and key variables such as monomer content, the impedance E of the interface is optimized; through lots of experimental researches, there is a numerical dependence relationship among the impedance E of the interface, the ion conductivity F, the contact angle C and viscosity D of the oligomer solution and the percentage W of monomers in the oligomer solution.

In some embodiments, the electrolyte solution comprises an organic solvent, an additive and a lithium salt.

In some embodiments, the mass percentage of the organic solvent in the electrolyte solution is 60%-80%. Specifically, the mass percentage of the solvent in the electrolyte solution can be 60%, 63%, 65%, 68%, 70%, 72%, 74%, 75%, 76%, 77%, 78%, 79% or 80%, etc., of course, it can also be other values ranging from 60% to 80%, without limitation here.

In some embodiments, the organic solvent comprises carbonate compounds or carboxylate compounds.

In some embodiments, the carbonate compounds comprise at least one of ethyl carbonate, propylene carbonate, diethyl carbonate, dimethyl carbonate, methyl ethyl carbonate, ethylene carbonate, fluoroethylene carbonate, propylene carbonate and butene carbonate. It can be understood that the carbonate compounds have carbonate groups, the polar group (for example ether oxygen group, ester group, etc.) in the main chain similar to that of the carbonate compounds of the polymer has good miscibility with the carbonate compounds, thereby improving the interface between the organic solvent in the electrolyte and the polymer molecule chain and then enhancing the absorption capacity of the polymer on the organic solvent in the electrolyte solution.

In some embodiments, the carboxylate compounds comprise at least one of ethyl acetate, ethyl propionate, propyl propionate, propyl acetate or benzyl formate. It can be understood that the carboxylate in the electrolyte solution can generate good miscibility with the polymer molecule chain, and then the absorption capacity of the polymer on the organic solvent in the electrolyte solution can be enhanced.

In some embodiments, the electrolyte solution comprises an organic solvent, an additive and a lithium salt, and the mass percentage of the additive in the electrolyte solution is 1%-10%, specifically 1%, 2%, 3%, 4%, 5%, 6%, 7%, 8%, 9% or 10%, etc., of course, it can also be other values within the above-mentioned range, without limitation here.

In some embodiments, the electrolyte solution comprises an organic solvent, an additive and a lithium salt, and the additive comprises at least one of vinyl sulfate, propane sultone, citric anhydride and triphenyl phosphite.

In some embodiments, the electrolyte solution comprises an organic solvent, an additive and a lithium salt, and the mass percentage of the lithium salt in the electrolyte solution is 10%-30%.

Specifically, the mass ratio of the lithium salt in the electrolyte solution can be 10%, 11%, 13%, 15%, 18%, 20%, 23%, 25%, 27%, 29% or 30%, etc., of course, it can also be other values within the above-mentioned range, without limitation here.

In some embodiments, the electrolyte solution comprises an organic solvent, an additive and a lithium salt, and the lithium salt comprises at least one of lithium hexafluorophosphate, lithium difluorosulfonymide, lithium trifluoromethylsulfonamide, lithium tetrafluoroborate, lithium bis(oxalate)borate and lithium difluorooxalate borate.

In some embodiments, the oligomer solution of the polymer electrolyte also comprises an initiator, and the presence of the initiator can facilitate thermal decomposition and free radical polymerization between the monomers. Preferably, the initiator comprises a free radical initiator.

In some embodiments, the initiator comprises at least one of azonitrile compounds and peroxide compounds.

In some embodiments, the azonitrile compounds comprise azodiisobutyronitrile and/or azodiisobutyronitrile.

In some embodiments, the peroxide compounds comprise at least one of benzoyl peroxide, tert-butyl benzoyl peroxide, dodecyl peroxide, diisopropyl dicarbonate peroxide, diisopropyl hydrogen peroxide, p-menthane hydrogen peroxide and methyl ethyl ketone peroxide.

In some embodiments, the oligomer solution of the polymer electrolyte also comprises an initiator, the mass percentage of the initiator in the oligomer solution of the polymer electrolyte is 0.02%-0.12%, specifically 0.02%, 0.05%, 0.06%, 0.07%, 0.08%, 0.09%, 0.1%, 0.11% or 0.12%, etc., of course, it can also be other values within the above-mentioned range, without limitation here.

In some embodiments, the mass percentage of the electrolyte solution in the oligomer solution of the polymer electrolyte is 88%-98%, specifically can be 88%, 89%, 90%, 91%, 92%, 93%, 94%, 95%, 96%, 97% or 98%, etc., of course, it can also be other values within the above-mentioned range, without limitation here.

In a second aspect, the present application provides a polymer electrolyte, the polymer electrolyte being obtained by in-situ polymerization of the oligomer solution of the polymer electrolyte according to the first aspect, and the polymer electrolyte comprising a molecule chain of a polymer with a structure represented by Formula III,

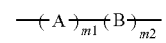

Formula III wherein, A is the first acrylate monomer represented by Formula I, B is the second acrylate monomer represented by Formula II, and m1>0, m2>0, and m1+m2>0; the preferred value of m1 is in a range of 20-400, and the value of m2 is in a range of 20-400; the first acrylate monomer and the second acrylate monomer are polymerized to form the polymer molecular chain, and the polymer molecular chain is cross-linked to form a polymer with a three-dimensional network structure;

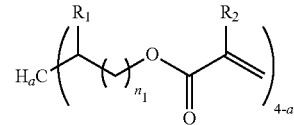

Formula I

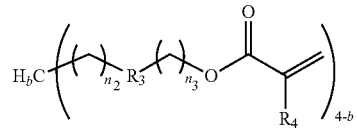

Formula II in Formula I, $R_1$ is selected from substituted or unsubstituted C5-C20 conjugated aromatic groups; $R_2$ is selected from a hydrogen atom or methyl; the value of n1 is a natural number ranging from 0 to 5; the value of a is a natural number ranging from 0 to 3;

in Formula II, $R_3$ is the polar group, $R_4$ is selected from a hydrogen atom or methyl; the value of n2 is a natural number ranging from 1 to 5, and the value of b is a natural number ranging from 0 to 3.

In the above-mentioned solution, the monomers in the oligomer solution of the polymer electrolyte generate in-situ free radical polymerization in the presence of an initiator to form a polymer molecule chain, and the polymer molecule chain is cross-linked to form a polymer electrolyte with a three-dimensional network structure. The side group of the polymer molecule chain contains a polar group which can interact with structural defects such as hydroxyl, amino or carboxyl of anode graphite or the carbon layer on the silicon-based particle surface, promote the formation of good contact between the polymer electrolyte with metal ions; the polymer molecule chains together with cathode metal ions can also generate polarity to be mutually attracted to improve the connection strength between the polymer molecule chain and the cathode active substance, thereby effectively infiltrating cathode active particles and exerting the effective capacity of the cathode material.

As shown in FIG. 1, the polymer molecular chain is cross-linked to form the polymer electrolyte with the three-dimensional network structure, solid points represent cross-linking between monomers, and three or four polymer molecular chain segments with a structure represented by Formula III are connected at a cross-linking position, and lines between the cross-linking points represent the polymer molecular chain segments.

In some embodiments, when m1=0, the polymer molecular chain between the cross-linking points is a monomer B (second acrylate monomer) homopolymer.

In some embodiments, when m2=0, the polymer molecular chain between the cross-linking points is a monomer A (first acrylate monomer) homopolymer.

In some embodiments, when both m1 and m2 are more than 0, namely m1+m2>0, the polymer molecular chain between the cross-linking points is a monomer A (first acrylate monomer) and monomer B (second acrylate monomer) copolymer, as shown in FIG. 1, the monomer A (first acrylate monomer) and the monomer B (second acrylate monomer) can be copolymerized, each of the monomers at least has a carbon-carbon double bond to participate in copolymerization reaction, the rest carbon-carbon double bonds may be unreacted or continue to be polymerized with other monomers, at this moment, the rest carbon-carbon double bonds in the monomer can react with the same monomer or different monomers, and then cross-linking points are generated. Therefore, the polymer electrolyte obtained by polymerization in the present application is in three-dimensional network structure.

Next, this solution will be described in detail in conjunction with specific examples.

Step S10, Preparing an Oligomer Solution of a Polymer Electrolyte

In some embodiments, the oligomer solution of the polymer electrolyte comprises monomers and an electrolyte solution. Specifically, the monomers are evenly mixed with the electrolyte solution in a certain ratio to obtain the oligomer solution of the polymer electrolyte.

In some embodiments, the monomers comprise a first acrylate monomer represented by Formula I and a second acrylate monomer represented by Formula II;

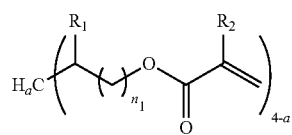

Formula I

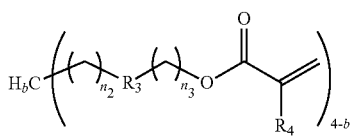

Formula II in Formula I, $R_1$ is selected from substituted or unsubstituted C5-C20 conjugated aromatic groups; $R_2$ is selected from a hydrogen atom or methyl; the value of n1 is a natural number ranging from 0 to 5; the value of a is a natural number ranging from 0 to 3;

in Formula II, $R_3$ is the polar group, $R_4$ is selected from a hydrogen atom or methyl; the value of n2 is a natural number ranging from 1 to 5, and the value of b is a natural number ranging from 0 to 3.

It is noted that the synthesis of the above-mentioned monomers can be achieved by esterification reaction. The specific synthesis steps include:

Acrylic acid or methacrylic acid react with alcohols by heating, and the obtained reaction product is filtered and dried to obtain monomers.

In some embodiments, the alcohol can be hydroxyethyl propionate or 2-naphthyl-1-propanol, a catalyst can be anhydrous calcium chloride, the temperature of the heating reaction can be 30° C.-80° C., the time of the heating reaction is 3 h-12 h, drying specifically is that the filtrate is dried by using a desiccant such as anhydrous sodium sulfate.

In some embodiments, the mass percentage of the monomers in the oligomer solution of the polymer electrolyte is W %, and the value of W is in a range of 2-10.

In some embodiments, the mass ratio of the first acrylate monomer to the second acrylate monomer in the oligomer solution of the polymer electrolyte is 1:9-9:1.

In some embodiments, the mass percentage of the electrolyte solution in the oligomer solution of the polymer electrolyte is 88%-98%.

In some embodiments, the electrolyte solution comprises an organic solvent, an additive and a lithium salt.

In some embodiments, the mass percentage of the organic solvent in the electrolyte solution is 60%-80%.

In some embodiments, the organic solvent comprises carbonate ester compounds or carboxylate ester compounds.

In some embodiments, the carbonate ester compounds comprise at least one of ethyl carbonate, propylene carbonate, diethyl carbonate, dimethyl carbonate, methyl ethyl carbonate, ethylene carbonate, fluoroethylene carbonate, propylene carbonate and butene carbonate. It can be understood that the carbonate compounds have carbonate groups, the polar group (for example ether oxygen group, ester group, etc.) in the main chain of the polymer has good miscibility with the carbonate compounds, thereby improving the interface between the organic solvent in the electrolyte and the polymer molecule chain and then enhancing the absorption capacity of the polymer on the organic solvent in the electrolyte solution.

In some embodiments, the carboxylate ester compounds comprise at least one of ethyl acetate, ethyl propionate, propyl propionate, propyl acetate or benzyl formate. It can be understood that the carboxylate in the electrolyte solution can generate good miscibility with the polymer molecule chain, and then the absorption capacity of the polymer on the organic solvent in the electrolyte solution can be enhanced.

In some embodiments, the electrolyte solution comprises an additive, and the mass percentage of the additive in the electrolyte solution is 1%-10%.

In some embodiments, the additive comprises at least one of vinyl sulfate, propane sultone, citric anhydride and triphenyl phosphite.

In some embodiments, the mass percentage of the lithium salt in the electrolyte solution is 10%-30%.

In some embodiments, the lithium salt comprises at least one of lithium hexafluorophosphate, lithium difluorosulfonymide, lithium trifluoromethylsulfonamide, lithium tetrafluoroborate, lithium bis(oxalate)borate and lithium difluorooxalate borate.

In some embodiments, the oligomer solution of the polymer electrolyte also comprises an initiator.

In some embodiments, the initiator comprises at least one of azonitrile compounds and peroxide compounds.

In some embodiments, the initiator comprises azonitrile compounds comprising azodiisobutyronitrile and/or azobisvaleronitrile.

In some embodiments, the initiator comprises peroxide compounds comprising at least one of benzoyl peroxide, tert-butyl benzoyl peroxide, dodecyl peroxide, diisopropyl dicarbonate peroxide, diisopropyl hydrogen peroxide, p-menthane hydrogen peroxide and methyl ethyl peroxide.

In some embodiments, the mass percentage of the initiator in the oligomer solution of the polymer electrolyte is 0.02%-0.12%.

Step S20, adding the oligomer solution of the polymer electrolyte into an assembled dry cell, and heating to generate in-situ polymerization reaction to obtain a battery comprising a cathode, an anode, a separator and a polymer electrolyte.

In some embodiments, the reaction temperature of the in-situ polymerization is 40° C.-80° C.

Specifically, the reaction temperature of in-situ polymerization can be 40° C., 45° C., 50° C., 55° C., 60° C., 65° C., 70° C., 75° C. or 80° C., etc., of course, it can also be other values within the above range, without limitation here.

In some embodiments, the reaction time of in-situ polymerization is 6 h-24 h, which can be 6 h, 8 h, 10 h, 12 h, 15 h, 17 h, 20 h, 21 h, 22 h, 23 h or 24 h, etc., of course, it can also be other values within the above range, without limitation here. In the above solution, the organic monomer is injected into the cell. Due to the organic monomer being in a liquid state, it can extremely well infiltrate the anode and cathode of the cell; subsequently, in-situ polymerization and thermal curing is performed to obtain a semi-solid battery achieving molecule-level contact with the cathode and the anode. Where, the cathode of the battery is a high nickel ternary material, the anode of the battery is graphite or a silicon substrate, and the separator is a porous skeleton material such as polypropylene, polyethylene or a cellulose film.

In some embodiments, the impedance of the polymer electrolyte is E mΩ, and the value of E is in a range of 30-100. Specifically, the impedance E of the polymer electrolyte can be 30 mΩ, 35 mΩ, 40 mΩ, 45 mΩ, 50 mΩ, 55 mΩ, 60 mΩ, 65 mΩ, 70 mΩ, 75 mΩ, 80 mΩ, 85 mΩ, 90 mΩ, 95 mΩ or 100 mΩ etc., of course, it can also be other values within the above range, without limitation here. In the solid battery, the interface infiltration effect of the polymer electrolyte on the electrode can be characterized by testing the impedance (direct current resistance DCR) of the polymer electrolyte. The more sufficient infiltration can lead to enhanced dissolution and conduction ability of the solid electrolyte on the lithium ions and smaller impedance. Hence, the electrode is infiltrated by using the oligomer solution of the polymer electrolyte, the impedance (DCR) of the polymer electrolyte obtained by in-situ heating and polymerization can be controlled within the above range, accordingly, the polymer electrolyte can be in sufficient contact with the interface of the electrode, thereby exhibiting good infiltration effect of the polymer electrolyte.

In some embodiments, the ion conductivity of the polymer electrolyte is F ms/cm, and the values of F is in a range of 1-9, specifically 1 mS/cm, 2 mS/cm, 3 mS/cm, 4 mS/cm, 5 mS/cm, 6 mS/cm, 7 mS/cm, 8 mS/cm or 9 mS/cm, without limitation here.

It can be understood that the dissolution and conduction ability of the polymer electrolyte on lithium ions can be characterized through ion conductivity, the primary function of electrolyte materials is to conduct lithium ions, high ion conductivity is required to effectively act as a medium, otherwise, the polarization inside the battery is extremely severe, making it difficult to effectively charge and discharge; if there is poor infiltration between the electrolyte and the interface of the electrode, the high ion conductivity of the electrolyte cannot function, resulting in ineffective ion conduction. The ion conductivity of the electrolyte is in the above range, which, on the one hand, can meet high ion conductivity required for lithium ion conduction; on the other hand, can ensure good infiltration between the electrolyte and the interface of the electrode, thereby exerting the high ion conductivity of the electrolyte and effectively conducting lithium ions.

In a third aspect, the present application provides an electrochemical device, the electrochemical device comprising the polymer electrolyte according to the second aspect.

The embodiments of the present disclosure will be further described by using many examples. Where, the embodiments of the present disclosure are not limited to the following specific examples. Within the scope of unchanged claims, appropriate changes can be made and implemented.

Example 1

(1) 5 g of first acrylate monomer (having a structure represented by Formula I-1, n1=1, a=0, $R_1$ was naphtyl, and $R_2$ was methyl), 5 g of second acrylate monomer (having a structure represented by Formula II-1, n2=1, n3=2, b=0, $R_3$ was an ester group, and $R_4$ was methyl) and 0.1 g of azobisisobutyronitrile were dissolved into 90.4 g of electrolyte solution, and evenly mixed in a drying room (with relative humidity being less than 2%, and a dew point being less than −40° C.) at room temperature to obtain an oligomer solution of a polymer electrolyte; wherein, a mass ratio of the first acrylate monomer to the second acrylate monomer was 1:1, the electrolyte solution contained 30 g of methyl ethyl carbonate, 20 g of diethyl carbonate, 16 g of propylene carbonate, 8 g of fluoroethylene carbonate, 0.2 g of triphenyl phosphite, 0.7 g of ethylene sulfate, 0.5 g of citric anhydride, 10 g of lithium hexafluorophosphate and 5 g of lithium difluorosulfonate;

(2) the oligomer solution of the polymer electrolyte was injected into a dry cell assembled with cathode and anode electrodes and a separator, pre-sealed with a thermoplastic sealing machine, slowly heated to 60° C. in a hot oven after standing and infiltrating for 24 h-72 h at room temperature, and reacted for 24 h to obtain a polymer electrolyte gel which was prepared into a solid battery.

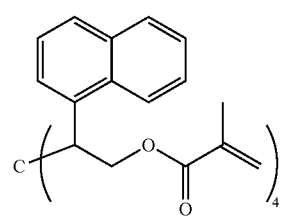

Formula I-1

Formula II-1

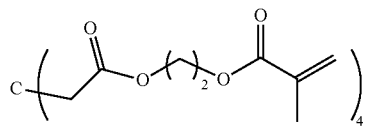

Example 2

(1) 6 g of first acrylate monomer (having a structure represented by Formula I-2, n1=1, a=0, $R_1$ was naphtyl, and $R_2$ was a hydrogen atom), 3 g of second acrylate monomer (having a structure represented by Formula II-2, n2=1, n3=2, b=0, $R_3$ was an ester group, and $R_4$ was a hydrogen atom) and 0.09 g of azodiisoheptanitrile were dissolved into 90.6 g of electrolyte solution, and evenly mixed in a drying room (with relative humidity being less than 2%, and a dew point being less than −40° C.) at room temperature to obtain an oligomer solution of a polymer electrolyte; wherein, a mass ratio of the first acrylate monomer to the second acrylate monomer was 2:1, the electrolyte solution contained 20 g of methyl carbonate, 15 g of dimethyl carbonate, 15 g of ethyl propionate, 12 g of ethylene carbonate, 10 g of fluoroethylene carbonate, 0.3 g of propylene sulfonate lactone, 0.8 g of ethylene sulfate, 0.5 g of citric anhydride, 6 g of lithium hexafluorophosphate, 10 g of lithium difluorosulfonate and 1 g of lithium difluorosulfonate; (2) the oligomer solution of the polymer electrolyte was injected into a dry cell assembled with cathode and anode electrodes and a separator, pre-sealed with a thermoplastic sealing machine, slowly heated to 50° C. in a hot oven after standing and infiltrating for 24 h at room temperature, and reacted for 48 h to obtain a polymer electrolyte gel which was prepared into a solid battery.

Formula I-2

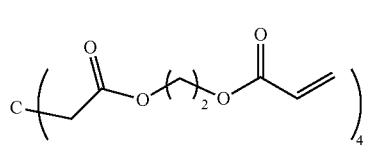

Formula II-2

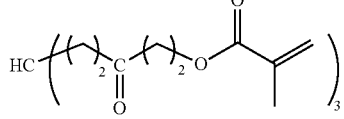

Example 3

Compared with example 1, the difference was that 5 g of first acrylate monomer (having a structure represented by Formula I-3, n1=2, a=0, $R_1$ was pyridyl, and $R_2$ was methyl) and 5 g of second acrylate monomer (having a structure represented by Formula II-3, n2=2, n3=2, b=1, $R_3$ was an oxygen atom, and $R_4$ was methyl) were used; wherein, a mass ratio of the first acrylate monomer to the second acrylate monomer was 1:1.

Formula I-3

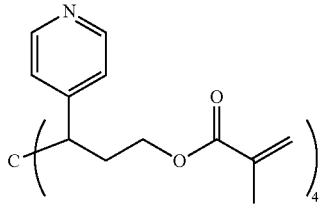

Formula II-3

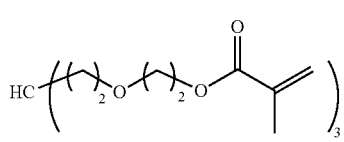

Example 4

Compared with example 1, the difference was that 5 g of first acrylate monomer (having a structure represented by Formula I-4, n1=2, a=0, $R_1$ was acenaphthenyl, and $R_2$ was methyl) and 5 g of second acrylate monomer (having a structure represented by Formula II-4, n2=2, n3=2, b=1, $R_3$ was carbonyl, and $R_4$ was methyl) were used;

wherein, a mass ratio of the first compound to the second compound was 1:1.

Formula I-4

Formula II-4

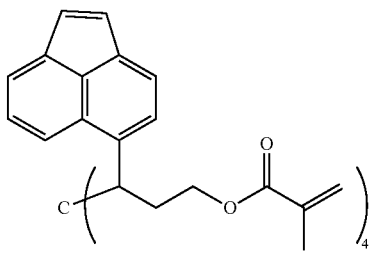

Example 5

Compared with example 1, the difference was that 8 g of first acrylate monomer (having a structure represented by Formula I-5, n1=1, a=1, $R_1$ was phenyl, and $R_2$ was methyl) and 2 g of second acrylate monomer (having a structure represented by Formula II-5, n2=2, n3=2, b=1, $R_3$ was carbonyl, and $R_4$ was methyl) were used;

wherein, a mass ratio of the first acrylate monomer to the second acrylate monomer was 4:1.

Formula I-5

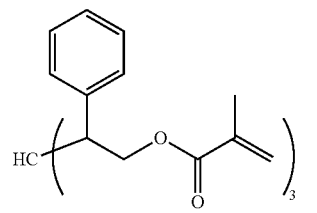

Formula II-5

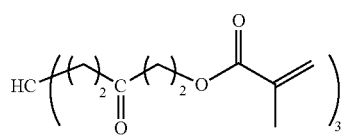

Example 6

Compared with example 1, the difference was that 6 g of first acrylate monomer (having a structure represented by Formula I-6, n1=1, a=1, $R_1$ was fluorenyl, and $R_2$ was methyl) and 3 g of monomer B6 (having a structure represented by Formula II-6, n2=2, n3=2, b=1, $R_3$ was a sulfur atom, and $R_4$ was methyl) were used; wherein, a mass ratio of the first acrylate monomer to the second acrylate monomer was 2:1.

Formula I-6

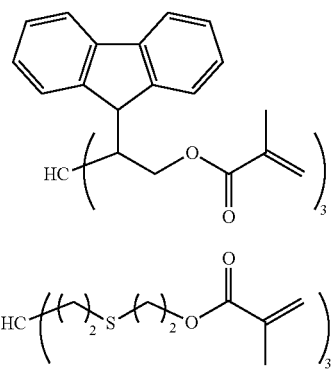

Formula II-6

Example 7

Compared with example 1, the difference was that 5 g of first acrylate monomer (having a structure represented by Formula I-7, n1=1, a=2, $R_1$ was phenyl, and $R_2$ was methyl) and 5 g of second acrylate monomer (having a structure represented by Formula II-7, n2=2, n3=2, b=2, $R_3$ was an oxygen atom, and $R_4$ was a hydrogen atom) were used; wherein, a mass ratio of the first acrylate monomer to the second acrylate monomer was 1:1.

Formula I-7

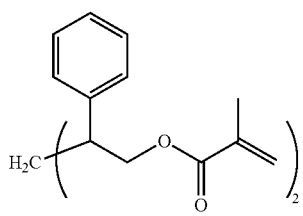

Formula II-7

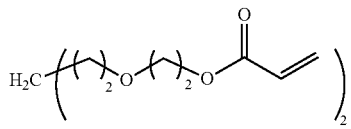

Example 8

Compared with example 1, the difference was that 5 g of first acrylate monomer (having a structure represented by Formula I-8, n1=1, a=3, $R_1$ was phenyl, and $R_2$ was a hydrogen atom), 5 g of second acrylate monomer (having a structure represented by Formula II-8, n2=2, n3=2, b=2, $R_3$ was an oxygen atom, and $R_4$ was a hydrogen atom) were used; wherein, a mass ratio of the first acrylate monomer to the second acrylate monomer was 1:1.

Formula I-8

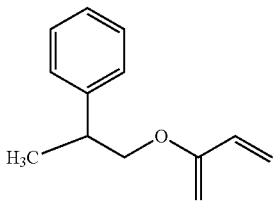

Formula II-8

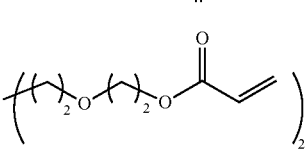

Example 9

Compared with example 1, the difference was that 9 g of first acrylate monomer (having a structure represented by Formula I-9, n1=1, a=0, $R_1$ was naphthyl, and $R_2$ was a hydrogen atom), 1 g of second acrylate monomer (having a structure represented by Formula II-9, n2=1, n3=2, b=0, $R_3$ was an ester group, and $R_4$ was methyl) were used; wherein, a mass ratio of the first acrylate monomer to the second acrylate monomer was 9:1.

Formula I-9

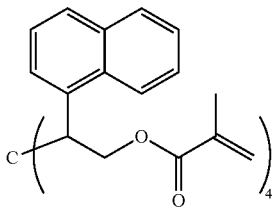

Formula II-9

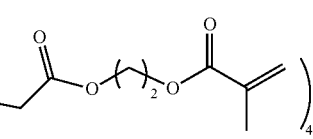

Comparative Example 1

Compared with example 1, the difference was that 5 g of first acrylate monomer (having a structure represented by Formula I-1, n1=1, a=0, $R_1$ was naphthyl, and $R_2$ was methyl) was only added without the addition of the second acrylate monomer.

Comparative Example 2

Compared with example 1, the difference was that 5 g of second acrylate monomer (having a structure represented by Formula II-1, n2=1, n3=2, b=0, $R_3$ was an ester group, and $R_4$ was methyl) was only added without the addition of the first acrylate monomer.

Comparative Example 3

Compared with example 1, the difference was that 5 g of first acrylate monomer (having a structure represented by Formula I-10, n1=1, a=0, $R_1$ was methyl, and $R_2$ was methyl) and 5 g of second acrylate monomer (having a structure represented by Formula II-10, n2=1, n3=2, b=0, $R_3$ was an oxygen atom, and $R_4$ was methyl) were used;

wherein, a mass ratio of the first acrylate monomer to the second acrylate monomer was 1:1.

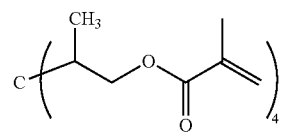

Formula I-10

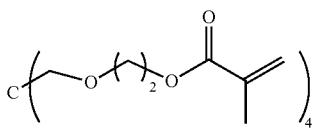

Formula II-10

Comparative Example 4

Compared with example 1, the difference was that 5 g of first acrylate monomer (having a structure represented by Formula I-11, n1=1, a=0, $R_1$ was naphthyl, and $R_2$ was methyl) and 5 g of second acrylate monomer (having a structure represented by Formula II-11, n2=1, n3=8, b=0, $R_3$ was a carbon atom, and $R_4$ was methyl) were used;

wherein, a mass ratio of the first acrylate monomer to the second acrylate monomer was 1:1.

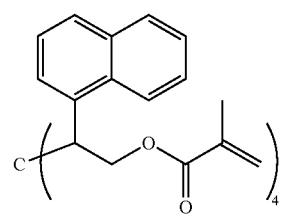

Formula I-11

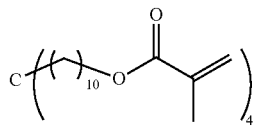

Formula II-11

Test Method (1) Test Method of Impedance (DCR) of Polymer Electrolyte

By referring to national standard GB/T 31467, the DCR of a battery is tested, wherein an adopted battery system is a stacked soft pack battery in which a cathode is a high nickel ternary 811 series cathode material, an anode was artificial graphite and a separator is a polypropylene/polyethylene/polypropylene three-layer membrane porous material, DCR discharge (I1, t1)=|V0−V1|/I1, wherein V0 is a sampling voltage at the end of standing, V1 is a voltage at the end of discharge, t1 is discharge duration, and I1 is a discharge current value and Imax is specified as a maximum allowable current value, generally 1.5 C-3 C. This test and calculation method is simple, charge and discharge is only performed on the battery for a period of time, and then the value of DCR is calculated.

(2) Test Method of Ion Conductivity of Polymer Electrolyte

A polymer electrolyte film sample is clamped with two pieces of stainless steel sheets and put in a 2016 type battery case, lithium ion conductivity is measured using an electrochemical alternating-current impedance method in an electrochemical working station (BioLogic Science Instruments), a frequency range is 0.1 Hz-100 kHz, according to σ=L/(R*S), σ was ion conductivity, L is a thickness of an electrolyte, S is a contact area between an electrolyte film and an electrode, and R is an impedance measured by an impedance meter.

(3) Test Method of Viscosity of Oligomer Solution of Polymer Electrolyte

The viscosity of the oligomer solution of the polymer electrolyte is measured using a DNJ-5S digital rotary viscometer, the oligomer solution is poured into a flat bottomed container with a diameter being larger than 60 mm, the temperature of the oligomer solution is maintained at 25° C., and an operation table is stable without vibration. An meter protection bracket is screwed into the head of the lower end of the meter, a LO rotor is used to be screwed counterclockwise into a universal joint of the meter, a lifting knob is rotated so that the rotator slowly is immersed into the oligomer solution until the liquid level marker namely groove scale of the rotator is in the same plane as the liquid level, and then the level of the meter is adjusted again. A rotator selection button is pressed, a rotation speed is selected and then an OK key is pressed. The rotator starts to rotate, a stop key is pressed after a displayed value is stable, and then a viscosity value is read.

(4) Test Method of Interface Contact Angle of Oligomer Solution of Polymer Electrolyte A liquid sample to be tested is aspirated using a trace infusion needle and mounted on an automatic sampler; small pieces of cathode and anode plates are respectively cut, a high nickel ternary 811 series cathode material and artificial graphite are adopted, the two ends of the electrode plates are clamped using a clamp holder, the electrode plate is stretched and flattened when the knob is adjusted and placed on a measurement platform; the automatic sampler is controlled through software to inject 1 μL of sample droplet, a picture at the moment of droplet being in contact with the electrode plate is captured by a high-speed camera and the interface contact angle of the electrode plate is automatically calculated, and then an average value of two electrode plates is taken.

TABLE 1

Performance parameters of polymer electrolyte in examples and comparative examples

| Performance parameter | Interface contact angle C (°) | Viscosity D (cP) | Ion conductivity F (mS/cm) | Impedance E (mΩ) |
|---|---|---|---|---|
| Example 1 | 45 | 8 | 6 | 51 |
| Example 2 | 40 | 7 | 7 | 44 |
| Example 3 | 38 | 6 | 8 | 33 |
| Example 4 | 50 | 12 | 3 | 68 |
| Example 5 | 35 | 5 | 9 | 40 |
| Example 6 | 48 | 15 | 5 | 65 |
| Example 7 | 39 | 14 | 3 | 84 |
| Example 8 | 41 | 16 | 3 | 88 |
| Example 9 | 62 | 23 | 1.5 | 205 |
| Comparative example 1 | 78 | 26 | 0.2 | 320 |
| Comparative example 2 | 75 | 28 | 0.1 | 380 |
| Comparative example 3 | 85 | 22 | 0.3 | 420 |
| Comparative example 4 | 89 | 21 | 0.2 | 460 |

TABLE 2

Impedance parameter values and its mathematical relationship formula values in examples and comparative examples

| Performance parameter | D *W*100/(F* cosC) | Impedance E (mΩ) | D*W*400*cosC |
|---|---|---|---|
| Example 1 | 18.76 | 51 | 225.1 |
| Example 2 | 11.79 | 44 | 193.67 |
| Example 3 | 9.47 | 33 | 188.17 |
| Example 4 | 61.9 | 68 | 230.32 |
| Example 5 | 6.75 | 40 | 162.98 |
| Example 6 | 40.49 | 65 | 362.46 |
| Example 7 | 59.76 | 84 | 432.94 |
| Example 8 | 70.28 | 88 | 480.78 |
| Example 9 | 325.3 | 205 | 429.32 |
| Comparative example 1 | 3275 | 320 | 113 |
| Comparative example 2 | 5664 | 380 | 152 |
| Comparative example 3 | 8387 | 420 | 76.31 |
| Comparative example 4 | 61455 | 460 | 14.21 |

Figure 2:
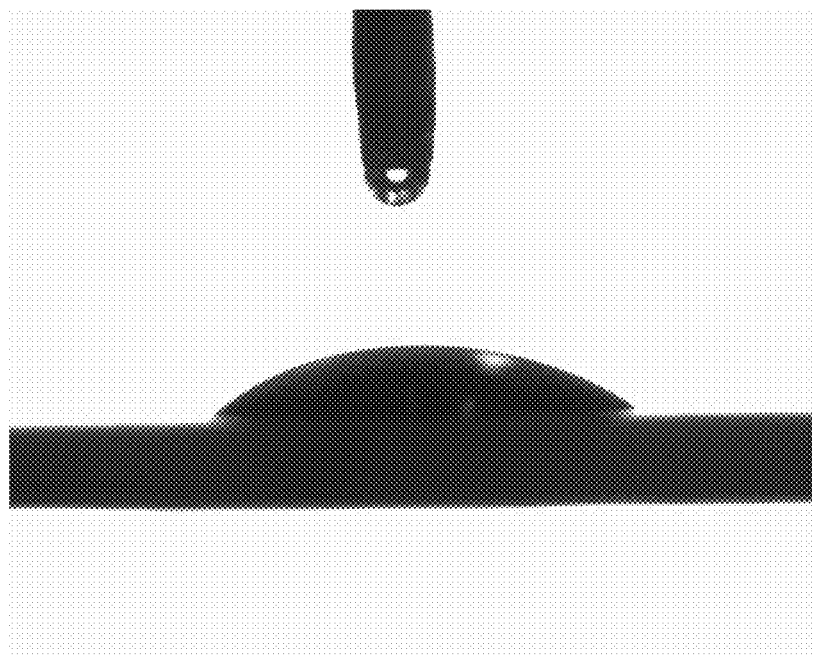
FIG. 2 is a diagram showing a test result of an interface contact angle of an oligomer solution of a polymer electrolyte provided in example 1 of the present application.
Figure 3:
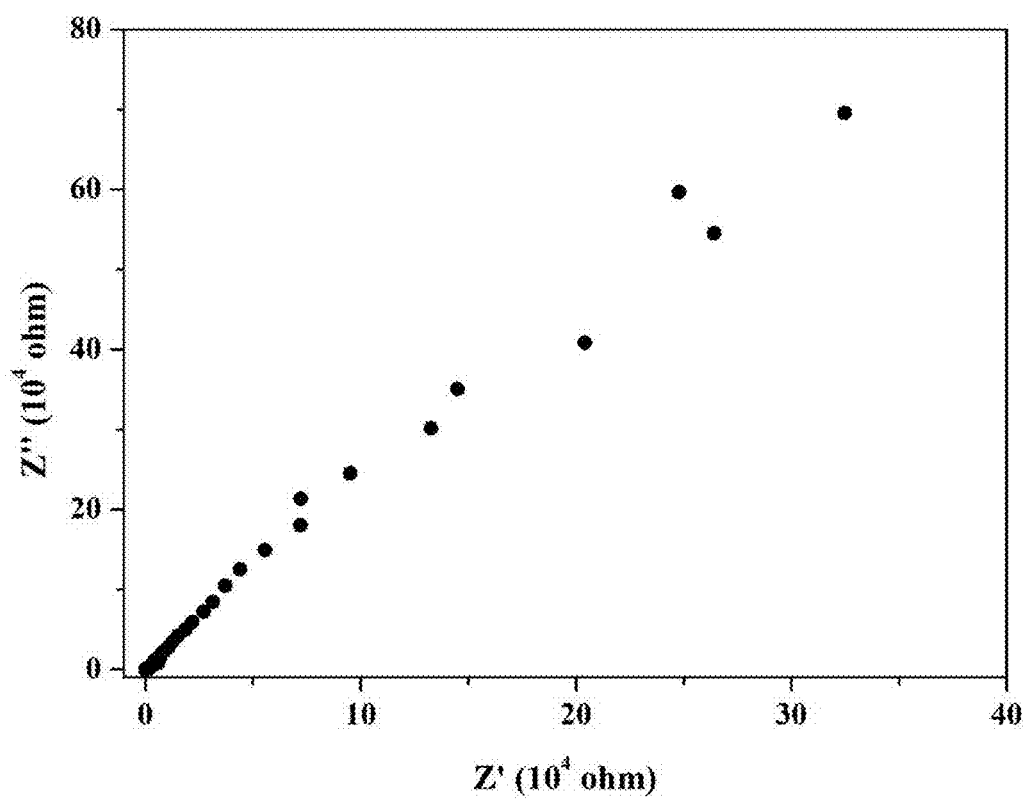
FIG. 3 is a diagram showing a test result of ion conductivity of a polymer electrolyte provided in example 1 of the present application.

It can be seen from results in FIG. 2 that the interface contact angle of the oligomer solution of the polymer electrolyte prepared in example 1 on the electrode is 45°, and the small contact angle indicates that the interface contact and infiltration of the oligomer solution on the electrode are good. It can be seen from results in FIG. 3 in that the lithium ion conductivity of the polymer electrolyte film prepared in example 1 is high, leading to rapid conduction of lithium ions.

It can be seen according to data in Table 1 that the interface contact angles of the oligomer solutions of the polymer electrolytes in examples 1-8 are small, which are between 30° and 60°, indicating that the interface contact and infiltration of the oligomer solution on the electrode are good. The viscosity of the oligomer solution of the polymer electrolyte is small, between 5 cP and 20 cP, which is beneficial for the oligomer solution of the polymer electrolyte to flow on the surface of the electrode, and fully infiltrating active substances on the electrode. The ion conductivity of the polymer electrolyte formed by polymerizing the oligomer solution of the polymer electrolyte can be up to 1 mS/cm or more, and its impedance (DCR) is between 30 mΩ-100 mΩ.

The oligomer solution of the polymer electrolyte comprises monomers and an electrolyte solution, the polymer molecule chain is formed by free radical polymerization of monomers, the polymer electrolyte with a three-dimensional network structure is formed by cross-linking polymer molecules, has viscosity and interacts with the electrode to form an interface between the electrode and the electrolyte, thereby improving the infiltration between the electrode and the electrolyte, increasing the ion conductivity of the polymer electrolyte, and reducing the impedance of the polymer electrolyte.

The mass ratio of the first acrylate monomer to the second acrylate monomer in the oligomer solution of the polymer electrolyte in example 9 is 9:1, the interface contact angle and viscosity of the oligomer solution of the polymer electrolyte are increased, the infiltration effect of the oligomer solution on the electrode is reduced, the ion conductivity of the polymer electrode is decreased, and the impedance of the electrolyte is enlarged. This is because the content of the first acrylate monomer is large, the polymer molecule chain difficultly maintains irregular flexibility, which is not beneficial for free stretching of the molecule chain, cannot further promote the flexibility, makes the movement ability of the polymer chain stronger, allows the diffusion resistance of the pole plate interface of the electrode to be smaller, and improves the infiltration effect of the solid electrolyte on the surface and interface of the electrode. Compared with example 1, the second acrylate monomer is not added in the oligomer solution of the polymer electrolyte of comparative example 1, the interface contact angle and viscosity of the oligomer solution of the polymer electrolyte are increased, the infiltration effect of the oligomer solution on the electrode is decreased, and there are no polar groups in the polymer molecule chain formed by polymerizing the first acrylate monomer in the oligomer solution, the binding strength of the polymer electrolyte and the electrode plate is reduced, the interface contact between the electrolyte and the electrode is not enough, good contact is difficultly formed between the electrolyte and the interface of the electrode plate so that the infiltration effect of the polymer electrolyte on the electrode is reduced, and the ion conductivity of the polymer electrolyte is greatly reduced, so as to enlarge the impedance of the polymer electrolyte.

Compared with example 1, the first acrylate monomer is not added in the oligomer solution of the polymer electrolyte of comparative example 2, so that the interface contact angle and viscosity of the oligomer solution of the polymer electrolyte are increased, the infiltration effect of the oligomer solution on the electrode is decreased, and conjugated aromatic groups are absent in the polymer molecule chain formed by polymerizing the second acrylate monomer in the oligomer solution, the interaction between the monomer molecule and the surface of the electrode is weakened, an effective interface contact area between the polymer molecule chain and the electrode is reduced, the interface contact between the electrolyte and the electrode is not enough, the polymer molecule chain difficultly forms a uniform and efficient interface layer on the particle surface of the electrode, the infiltration effect of the polymer electrolyte is poor, and the ion conductivity of the polymer electrolyte is low, leading to enlarged impedance of the polymer electrolyte.

Compared with example 1, the conjugated aromatic group is absent in the first acrylate monomer added in the oligomer solution of the polymer electrolyte of comparative example 3, so that the interface contact angle and viscosity of the oligomer solution of the polymer electrolyte are increased, the infiltration effect of the oligomer solution on the electrode is decreased, and conjugated aromatic groups are absent, which leads to weakened interaction between the monomer molecule and the surface of the electrode, is not beneficial for interface contact between the polymer molecule chain formed after monomer polymerization and the electrode; the interface infiltration of the polymer electrolyte is poor, and the ion conductivity of the polymer electrolyte is reduced, leading to enlarged impedance of the polymer electrolyte.

Compared with example 1, the second acrylate monomer added in the oligomer solution of the polymer electrolyte of comparative example 4 does not contain the polar group, so that the interface contact angle and viscosity of the oligomer solution of the polymer electrolyte are increased, the interface infiltration of the oligomer solution on the electrode is poor, the polymer molecular chain generated after polymerization does not contain the polar group, the binding strength of the polymer molecule chain and the electrode plate is reduced, and the effective infiltration of the active substance of the electrode is decreased, thereby leading to poor infiltration between the polymer electrolyte and the electrode; the ion conductivity of the polymer electrolyte is low, thereby leading to enlarged impedance of the polymer electrolyte.

Although the present application is disclosed as a preferred embodiment, it is not intended to limit the claims. Any person skilled in the art may make several possible changes and modifications without departing from the concept of this application. Therefore, the scope of protection of the present application should be based on the scope defined in the claims of the present application.

What is claimed is:

1. A solution, wherein the solution comprises monomers and an electrolyte solution, and the monomers comprise a first acrylate monomer containing a conjugated aromatic group and a second acrylate monomer containing a polar group; the first acrylate monomer is selected from compounds represented by Formula I,

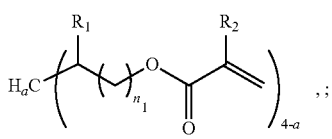

Formula I in the Formula I, $R_1$ is selected from substituted or unsubstituted C5-C20 conjugated aromatic groups; $R_2$ is selected from a hydrogen atom or a methyl; a value of n1 is a natural number ranging from 0 to 5; a value of a is a natural number ranging from 0 to 3;

the second acrylate monomer is selected from compounds represented by Formula II,

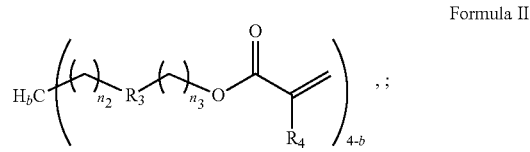

Formula II in the Formula II, $R_3$ is the polar group, $R_4$ is selected from the hydrogen atom or the methyl; a value of n2 is a natural number ranging from 1 to 5, a value of b is a natural number ranging from 0 to 3, a value of n3 is a natural number ranging from 1 to 5, and the polar group comprises at least one of an oxygen atom, a sulfur atom, a carbonyl, and an ester group;

wherein a mass percentage of the monomers in the solution is W %, an interface contact angle of the solution is C, a viscosity of the solution at 25° C. is D cP, a direct current resistance of a polymer solution at room temperature formed by polymerizing the solution is E mΩ, an ion conductivity of the polymer solution at room temperature formed by polymerizing the solution is F mS/cm, and the direct current resistance meets the following relationship:

$$D*W*100/(F*\cos C) \leq E \leq D*W*400*\cos C$$

wherein the polymerizing the solution occurs at a temperature between 40° C. and 80° C., and wherein the interface contact angle is a contact angle for a hydrophobic surface.

2. A solution, wherein the solution comprises monomers and an electrolyte solution, and the monomers comprise a first acrylate monomer containing a conjugated aromatic group and a second acrylate monomer containing a polar group; the first acrylate monomer is selected from compounds represented by Formula I,

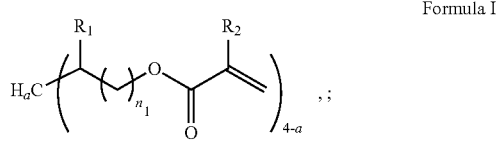

Formula I in the Formula I, $R_1$ is selected from substituted or unsubstituted C5-C20 conjugated aromatic groups; $R_2$ is selected from a hydrogen atom or a methyl; a value of n1 is a natural number ranging from 0 to 5; a value of a is a natural number ranging from 0 to 3;

the second acrylate monomer is selected from compounds represented by Formula II,

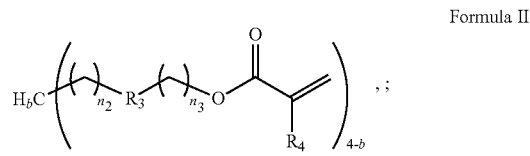

Formula II in the Formula II, $R_3$ is the polar group, $R_4$ is selected from the hydrogen atom or the methyl; a value of n2 is a natural number ranging from 1 to 5, a value of b is a natural number ranging from 0 to 3, a value of n3 is a natural number ranging from 1 o 5, and the polar group comprises at least one of an oxygen atom, a sulfur atom, a carbonyl, and an ester group;

wherein the solution also comprises an initiator, and the solution meets at least one of the following features (1)-(4):

(1) the initiator comprises at least one of azonitrile compounds and peroxide compounds;

(2) the initiator comprises the azonitrile compounds comprising azodiisobutyronitrile and/or azobisvaleronitrile;

(3) the initiator comprises the peroxide compounds comprising at least one of benzoyl peroxide, tert-butyl benzoyl peroxide, dodecyl peroxide, diisopropyl dicarbonate peroxide, diisopropyl hydrogen peroxide, p-menthane hydrogen peroxide, and methyl ethyl ketone peroxide;

(4) a mass percentage of the initiator in the solution is 0.02%-0.12%.

3. The solution according to claim 1, wherein the solution meets at least one of the following features (1)-(4):

(1) in the solution, a mass ratio of the first acrylate monomer to the second acrylate monomer is 1:9-9:1;

(2) a value of the C is in a range of 30-60;

(3) a value of the D is in a range of 5-20;

(4) a value of the W is in a range of 2-10.

* * * * *